(12) United States Patent  (10) Patent No.: US 7,463,914 B2
Blum  (45) Date of Patent: Dec. 9, 2008

(54) SUPERCONDUCTING ACYCLIC HOMOPOLAR ELECTROMECHANICAL POWER CONVERTER

(75) Inventor: Dieter Wolfgang Blum, Aldergrove (CA)

(73) Assignee: Dynamo Capital, Inc., Abilene, TX (US)

( * ) Notice: Subject to any disclaimer, the term of this patent is extended or adjusted under 35 U.S.C. 154(b) by 261 days.

(21) Appl. No.: 11/422,328

(22) Filed: Jun. 5, 2006

(65) Prior Publication Data

US 2006/0279164 A1    Dec. 14, 2006

Related U.S. Application Data

(60) Provisional application No. 60/688,890, filed on Jun. 8, 2005.

(51) Int. Cl.
  H02K 31/00 (2006.01)
  H02K 31/02 (2006.01)
  H02K 31/04 (2006.01)
  H02K 55/06 (2006.01)

(52) U.S. Cl. .......... 505/166; 310/178; 322/48; 505/163; 505/211

(58) Field of Classification Search .......... 310/178; 322/48; 505/163, 166, 211
  See application file for complete search history.

(56) References Cited

U.S. PATENT DOCUMENTS

| 293,758 | A | 2/1884 | Lubke |
|---|---|---|---|
| 339,772 | A | 4/1886 | Hering |
| 342,587 | A | 5/1886 | Eickemeyer |
| 342,588 | A | 5/1886 | Eickemeyer |
| 342,589 | A | 5/1886 | Eickemeyer |
| 351,902 | A | 11/1886 | Eickemeyer |
| 351,903 | A | 11/1886 | Eickemeyer |
| 351,904 | A | 11/1886 | Eickemeyer |
| 351,907 | A | 11/1886 | Eickemeyer |
| 352,234 | A | 11/1886 | Eickemeyer |
| 396,149 | A | 1/1889 | Eickemeyer |
| 400,838 | A | 4/1889 | Entz |
| 406,968 | A | 7/1889 | Tesla |
| 515,882 | A | 3/1894 | Maynadier |
| 523,998 | A | 8/1894 | Rennerfelt |
| 561,803 | A | 6/1896 | Mayer |

(Continued)

FOREIGN PATENT DOCUMENTS

EP    18964 A1 * 11/1980

OTHER PUBLICATIONS

PCT International Search Report and Written Opinion for International Application No. PCT/IB2006/003570; Date of Mailing May 24, 2007. 30 pages.

*Primary Examiner*—Karl Tamai
*Assistant Examiner*—David W. Scheuermann
(74) *Attorney, Agent, or Firm*—Patent Technologies, LLC; Robert D. Gunderman, Jr.

(57) ABSTRACT

An acyclic homopolar electromechanical power converter that uses superconducting series connected rotor elements for series summation of magnetomotive and electromotive force. The novel rotor assembly comprises a plurality of conductor elements connected in series by superconducting series connections. The behavior of the superconducting series connections provides a form of flux isolation and series summation of forces that has heretofore been impossible in electromechanical power converters. The superconducting series connections further modify the rotor impedance of an acyclic homopolar electromechanical power converter to provide long needed improvements to acyclic homopolar electromechanical power converter designs.

12 Claims, 14 Drawing Sheets

U.S. PATENT DOCUMENTS

| | | | |
|---|---|---|---|
| 645,943 | A | 3/1900 | Dalen et al. |
| 678,157 | A | 7/1901 | Bjamason |
| 742,600 | A | 10/1903 | Cox |
| 789,444 | A | 5/1905 | Noeggerath |
| 805,315 | A | 11/1905 | Noeggerath |
| 826,668 | A | 7/1906 | Ketchum |
| 832,742 | A | 10/1906 | Noeggerath |
| 854,756 | A | 5/1907 | Noeggerath |
| 859,350 | A | 7/1907 | Thomson |
| 3,229,133 | A | 1/1966 | Sears |
| 3,465,187 | A | 9/1969 | Breaux |
| 3,469,121 | A * | 9/1969 | Smith, Jr. ............... 310/10 |
| 3,646,394 | A * | 2/1972 | Swatz et al. ............ 315/205 |
| 3,875,484 | A | 4/1975 | Williams |
| 4,097,758 | A | 6/1978 | Jenkins |
| 4,514,653 | A | 4/1985 | Batni |
| 5,241,232 | A | 8/1993 | Reed |
| 5,278,470 | A | 1/1994 | Neag |
| 5,451,825 | A | 9/1995 | Strohm |
| 5,587,618 | A | 12/1996 | Hathaway |
| 5,977,684 | A | 11/1999 | Lin |
| 2001/0045790 | A1 * | 11/2001 | Whitesell ............... 310/236 |
| 2002/0053889 | A1 * | 5/2002 | Gold ..................... 318/154 |
| 2006/0279164 | A1 * | 12/2006 | Blum ..................... 310/261 |

* cited by examiner

SUPERCONDUCTING ACYCLIC HOMOPOLAR ELECTROMECHANICAL POWER CONVERTER

CROSS-REFERENCE TO RELATED PATENT APPLICATIONS

This application claims the benefit of the filing date of U.S. Provisional patent application No. 60/688,890 filed on Jun. 8, 2005.

BACKGROUND OF THE INVENTION

1. Field of the Invention

This invention relates generally to electromechanical power converters, and more particularly to improvements to acyclic homopolar electromechanical power converters.

2. Description of the Related Art

For a general understanding of the present invention, the following brief background of electromechanical power converters, acyclic machinery, and a historical perspective of electromagnetic machinery is presented.

The creation of magnetomotive force (MMF) in electrical conductor assemblies in the presence of a magnetic field by the flow of current in the electrical conductor assemblies causes translation of the electrical conductor assemblies with respect to the magnetic field. An apparatus used to produce a motive force using electrical current flow is commonly known as an electric motor.

The creation of an electromotive force through the translation of electrical conductor assemblies within a magnetic field is normally termed the generation of electricity from motive force. An apparatus used to generate electricity through the translation of electrical conductor assemblies within a magnetic field is commonly known as an electric generator.

The methods of utilizing electrodynamic interactions, as embodied by a motor in the case of magnetomotive force, or as embodied by a generator in the case of electromotive force, and their resultant apparatus embodiments may be divided into two classes, depending upon the temporal characteristics of the particular electrodynamic interactions utilized.

The first class of electrodynamic interactions, upon which the preponderance of present day electromagnetic machinery is based, can be termed cyclic. This terminology relates to the time varying (cyclical) nature of the electrodynamic interactions employed (at the macroscopic level). That is, there are cyclical electrodynamic interactions that effect either the production of Magnetomotive force or Electromotive Force within the apparatus (machine). Further, it is not at all relevant whether the cyclic apparatus utilizes or produces direct current or alternating current, as all cyclic machines are inherently dependant on time-variant electrodynamic interactions, and as such all cyclic machines are all based on alternating current or a form of time varying current. Today's direct current machines simply rely on commutation/switching means in order to appear as a direct current apparatus to the external world. Commutation or switching may be performed mechanically or electronically. Modern day direct current machine interactions are only quasi time-invariant during the time that a conductor element is translating (sweeping) through the mostly uniform magnetic field present under a salient pole of such a machine.

The second class of electrodynamic interactions are those that can be termed acyclic. This terminology relates to the time invariant (acyclical) nature of the electrodynamic interactions employed (at the macroscopic level). That is, there are acyclical (or continuous) electrodynamic interactions that effect either the production of magnetomotive force or electromotive force within the apparatus (machine.) Inherently, in all acyclic topologies, all macroscopic electrodynamic interactions are deemed to be time-invariant, that is, neither their polarity nor their intensity changes over time.

Acyclic machines have frequently been called homopolar, relating to having magnetic poles on the same center, or are sometimes referred to as Faraday machines, and have also been erroneously called unipolar (having one magnetic pole, which is incorrect, as all electromagnetic apparatus require and do indeed have, at least two opposing magnetic poles.)

Acyclic machines are the only true type of direct current apparatus in existence. Acyclic machines dispense with the many inefficiencies of cyclic alternating current machines, and further eliminate the need for expensive, cumbersome and maintenance prone commutation and switching devices used in today's "direct current" machines.

The present invention relates to the field of acyclic electromagnetic motors and generators that operate without the need for commutation or switching of electrical currents, and to acyclic electromagnetic motors and generators having a configurable operational rotor impedance to effect the series flow summation of magnetomotive force producing current or the series summation of produced electromotive force in electrical conductor assemblies subject to time-invariant electrodynamic interactions within a magnetic field.

Of necessary and relevant background to understanding and describing the present invention is a brief overview of the development of electrodynamics as it relates to electromagnetic machinery in general, and to acyclic machinery in particular, along with a discussion on how acyclic machinery has essentially been ignored in favor of more complex cyclical machinery.

In 1821, Faraday secured the rotary motion of a conductor carrying a DC electric current within a uniform, homogenous and radially symmetric magnetic field. He had discovered the continuous rotary electrodynamic production of magnetomotive force with an apparatus having a homopolar and acyclic topology. Faraday subsequently produced this "electromagnetic rotator" for shipment to other scientists, in order that they may reproduce his experimental results. Faraday went on to cause a magnet to revolve about the axis of a current-carrying conductor in 1821. These were certainly the world's first electric motors, being electromechanical converters for producing mechanical work from the flow of electricity.

Faraday's original homopolar/acyclic "electromagnetic rotator" effect was not investigated or pursued as a potential electric motor, primarily because of the large amount of DC current it required in order to operate due to its very low impedance. This lack of interest persisted in spite of the fact that the Faraday electromagnetic rotator required no complicated switching mechanism such as the solenoids used in the reciprocating "electric motors" of the time. Similar complicated switching mechanisms still exist in many of the direct current machines of today.

The continuous rotary electrodynamic production of electromotive force was first observed in 1831, also by Faraday. Again, Faraday secured the rotation of a conductor (in this case, a conductive disk) within a magnetic field and discovered that an electromotive force was "induced" between the center axis of the rotating disk and its periphery. When an external circuit was completed between the two points, an electric current was seen to flow. In this instance, Faraday had discovered the production of electromotive force with an apparatus having a homopolar and acyclic topology. This was the world's first direct-current electric generator, an electromechanical converter for producing electric current flow from the input of mechanical work.

Faraday's original homopolar generator was also not pursued as a potential electric generator, once again because it produced large amounts of DC current at low voltages due to it's characteristic low impedance.

From their inception and discovery, acyclic topologies for producing magnetomotive force or electromotive force have only been lightly investigated in comparison to conventional cyclic rotary electromechanical power converters. Due to their seemingly inherent low impedance, both acyclic generators and motors have to this day been relegated, for the most part, to laboratory use and specialty applications requiring low voltages and high currents.

Between 1900 and the present, there have been some notable developments in the field of acyclic generators and acyclic motors. In 1904, Noeggerath performed experiments attempting to produce higher DC voltages using a homopolar topology, wherein he series-connected multiple electromotive force inducing elements via slip-rings. This resulted in the successful construction of a 500 volt, 300 Kilowatt apparatus the same year. In 1912, Lamme at Westinghouse, designed, constructed and supplied a 260 volt, 2 Megawatt apparatus. This machine was used for a few years before it was mothballed because of the lower cost of AC power. In Germany, many firms were also building what was termed at the time unipolar generators. A 10 volt, 5000 amp @3000 RPM machine was constructed in 1913, and was still in service in 1940, being used to test high-current switches and interrupters (referenced in the German text "Unipolarmaschine fur kleine spannungen und hohe strome" published in "Elektrotechnische Zeitschrift, 61. Jahrg. Heft 16, 18. April 1940.)

By about 1920, current collector brush and slip-ring difficulties such as brush and slip-ring voltage drops and $I^2R$ losses had halted acyclic development, and the acyclic machine had been overtaken by commutated direct current machinery and later even more so by alternating current generators (alternators) due to their operating safety, reliability and economy. "As an electric generator for lighting and powergrid supply, the acyclic machine had lost its place forever!" (Translated from the German text "Unipolarmaschine fur kleine spannungen und hohe strome" published in "Elektrotechnische Zeitschrift, 61. Jahrg. Heft 16, 18. April 1940.)

For almost twenty years, acyclic methods and machinery lay dormant again. In reference texts, acyclic and homopolar machinery was given short and shrift treatment, generally with the remark that they failed due to the abovementioned brush/slip-ring and $I^2R$ problems. Due to the needs of the chemical industry just before WWII, there was a brief renewed interest in acyclic direct current generation, especially in Germany, where in 1935, a 7.5 volt, 150,000 amp @514 RPM machine was constructed. This machine was similar to machines constructed prior to WWI, in that it employed insulated conductors embedded into armature slots with brushes and slip-rings to provide the series electromotive force summation of multiple electromotive force inducing armature elements (referenced in the German text "Unipolarmaschine fur kleine spannungen und hohe strome" published in "Elektrotechnische Zeitschrift, 61. Jahrg. Heft 16, 18. April 1940.)

Much simpler in construction was an apparatus first proposed by Poirson, who in 1930 built a 7 volt, 15,000 amp @1800 RPM machine and then a second, substantially larger machine rated at 14 volt, 50,000 amp @750 RPM. This machine was demonstrated at the Paris World Exhibition in 1937. Both of these designs utilized a non-slotted rotor, which served as the armature core, slip-ring and electromotive force producing conductor (referenced in the German text "Unipolarmaschine fur kleine spannungen und hohe strome" published in "Elektrotechnische Zeitschrift, 61. Jahrg. Heft 16, 18. April 1940.)

After another dormancy period of 1940 to 1960, acyclic topologies again became a topic of interest, when General Electric and the US Navy investigated acyclic motors and generators for their potential applications in marine propulsion. An example of such a machine was an acyclic generator rated at 67V, 150000 A @3600 RPM, produced by General Electric in 1964, as mentioned in the text "Electromechanical Power Conversion" by Levi and Panzer, 1974.

Also, from the mid-1960's to the present, superconducting and high-temperature superconducting (HTS) field coil designs and liquid metal (eutectic) current collector brushes, have been introduced, developed and utilized in specific high-power applications such as fusion research, rail-gun launchers, welding, and the like. For example, the Center for Electromechanics (CEM) at the University of Texas at Austin has produced both disk and drum-type acyclic generators with outputs ranging from 5 to 10 Megawatts. They have also designed pulsed homopolar welding generators for pipe welding, which were produced by OIME Inc.

More recently, in 1997, the US Navy announced its HTSC (high-temperature super-conducting) acyclic/homopolar marine propulsion motor test results. Also in 1997, CEM and Parker Kinetic Designs announced their work on an acyclic traction motor for automobiles and locomotives. And even more recently (2002-2005), the US Navy announced further investigation of acyclic marine propulsion motors employing High Temperature Superconducting field coils using General Atomics' 5 Megawatt and 36 Megawatt machines.

Recently, acyclic machines employing rolling contacts that eliminate sliding current collectors have been introduced, and homopolar (but bipolar, and not acyclic) apparatus employing multiple microfibre composite metal brushes and multiple current carrying segment commutation have been proposed.

Systems for the electromechanical conversion of power are well known, for the most part concerning cyclical heteropolar topologies, that effect the series summation of magnetomotive force producing current flow through active conductor segments, or effect the series summation of the electromotive force produced in active conductor segments. In both of these heteropolar cases the chosen form for the active conductor assemblies is typically a coiled (or coil-formed) series conductor winding.

There are essentially three groups of related art involving acyclic machines. In Group 1 are the vast majority that do not use or employ series summation of active conductor segments or elements, but are simple single active conductor element apparatus such as disk, drum, cylindrical, bell-shaped, parallel connected drum, sheet stacks, and the like.

Group 2 includes those acyclic topologies which utilize a plurality of active conductor segments or elements and attempt to effect the series summation of produced magnetomotive force or induced electromotive force by utilizing multiple slip-ring/brush assemblies for such electrical series summation, or by utilizing counter-rotating active elements and attendant slip-ring/brush assemblies.

To the inventor's best present knowledge and belief, the following is a summary listing of such Group 2 related art:

U.S. Pat. No. 293,758 (Lubke, 1884); U.S. Pat. No. 339,772 (Hering, 1886); U.S. Pat. No. 342,587, U.S. Pat. No. 342,588, U.S. Pat. No. 342,589, U.S. Pat. No. 351,902, U.S. Pat. No. 351,903, U.S. Pat. No. 351,904, U.S. Pat. No. 351,907 and U.S. Pat. No. 352,234 (all to Eickemeyer, 1886); U.S. Pat. No. 406,968 (Tesla, 1889); U.S. Pat. No. 396,149 (Eickemeyer, 1889); U.S. Pat. No. 400,838 (Entz, 1889); U.S. Pat. No. 515,882 (Maynadier, 1894); U.S. Pat. No. 523,998 (Rennerfelt, 1894); U.S. Pat. No. 561,803 (Mayer, 1896); U.S. Pat. No. 645,943 (Dalen et al., 1900); U.S. Pat. No. 678,157 (Bjarnason, 1901); U.S. Pat. No. 742,600 (Cox, 1903); U.S. Pat. No. 789,444 and U.S. Pat. No. 805,315 (both to Noeggerath, 1905); U.S. Pat. No. 826,668 (Ketchum, 1906); U.S. Pat. No. 832,742 (Noeggerath, 1906); U.S. Pat. No. 854,756 (Noeggerath, 1907); U.S. Pat. No. 859,350 (Thomson, 1907); U.S. Pat. No. 3,229,133 (Sears, 1966); U.S. Pat. No. 3,465,187 (Breaux, 1969); U.S. Pat. No. 4,097,758 (Jenkins, 1978); U.S. Pat. No. 4,514,653 (Batni, 1985); U.S. Pat. No. 5,241,232 (Reed, 1993); and U.S. Pat. No. 5,587,618 (Hathaway, 1996.)

An example of recent related art attempting to provide for series summation of induced electromotive force potentials in acyclic generators (or of magnetomotive force in motors) is U.S. Pat. No. 5,241,232 to Reed, which utilizes a conductive belt between two or more active elements in order to provide for such series summation. The apparatus of the Reed patent is similar to that of Tesla from more than 100 years prior, in that they both utilize a flexible conductive belt to electrically connect two co-rotating active elements in series.

Another recent example is U.S. Pat. No. 5,587,616 to Hathaway, which utilizes a complex plurality of synchronously counter-rotating armatures and associated slip-rings and sliding contacts in order to provide for series summation.

The group 2 related art as described above attempts to create series summation using various complex and cumbersome techniques requiring multiple elements. The present invention improves upon the group 2 related art by using a single active element within the same total overall intensity magnetic flux field.

Group 3 related art contains those acyclic topologies which utilize a multiplicity of active conductor segments or elements and attempts to effect the series summation of produced magnetomotive force or induced electromotive force by utilizing some form of "series winding" or "series arrangement" of said multiple active conductor segments or elements, thereby attempting to provide such series summation directly.

To the inventor's best present knowledge, the following is a summary listing of such Group 3 related art: U.S. Pat. No. 5,278,470 (Neag, 1994); U.S. Pat. No. 5,451,825 (Strohm, 1995); and U.S. Pat. No. 5,977,684 (Lin, 1999.)

The Group 3 related art topologies and apparatus fail, however, to achieve the series summation of induced electromotive force (generator action) or produced magnetomotive force (motor action.) In U.S. Pat. No. 5,278,470 (Neag) and U.S. Pat. No. 5,451,825 (Strohm), the inventions fail to take into account the reverse electromotive forces that will be induced (or reverse magnetomotive force torques that will be produced) due to return flux paths/interlinkages interacting with active conductor segments/elements (whether such interaction was intended or not.)

In the particular case of the Neag patent, FIG. 1A of the Neag patent clearly shows flux paths/interlinkages being completed. In the process however, producing perfectly canceling electromotive forces or magnetomotive forces as the case might be, in the peripheral conductor segments forming part of his series winding on the rotor. The fact that the peripheral conductor segments are sunk into slots in the magnetically permeable rotor will not lead to any appreciable shielding of said conductor segments, and hence will fail to have the rotor series winding produce any measurable electromotive force or magnetomotive force, as the case may be.

In the particular case of the Strohm patent, although FIG. 1 of the Strohm patent implies magnetic flux vectors (B) in opposition to each other, thereby appearing to lead to the desired production of electromotive force or magnetomotive force in conductive elements (when they are translating through said B fields), the complete flux paths and interlinkages are not depicted nor discussed. Accordingly, once the complete flux paths/interlinkages are studied and examined, it is found that perfect electromotive force or magnetomotive force cancellation takes place once again, in almost an identical fashion as in Neag above, due to the interaction of the peripheral series conductor with said completed flux paths/interlinkages. Due to this unfortunate outcome, Strohm's later attempts at the series summation of a plurality of said translating conductive elements will most likely also fail.

In U.S. Pat. No. 5,977,684 to Lin, there will be a lack of desired induced electromotive force (or produced magnetomotive force) due to the fact that the uniform/symmetric axial magnetic flux field will not co-rotate at the input shaft angular velocity, but rather, it will appear to be stationary in the machines rotational (non-inertial) reference frame. Hence, there will not be a "moving" (i.e., rotating) magnetic flux field interacting with active conductor segments in one area, and a "non-moving" (i.e., static) magnetic flux field that is not interacting with series connecting conductor segments in another area. There will only exist static magnetic flux fields.

In summary, for the cases of related art pertaining to the class of electromechanical power converters termed as being of acyclic topology (and homopolar), the methods known and disclosed for series summation as in Group 2 are mostly impractical, and those known and disclosed as in Group 3 are not viable, and have thus contributed to maintaining the image of the acyclic homopolar converter as solely a low-impedance device.

In the past the practical use of acyclic (homopolar) motors and generators has been inhibited by the large voltage drop of conventional graphite-based electrical brushes. Recently, at least in principle, microfiber brushes and hybrid (metal/liquid) brushes, have promised to remove this previously critical bottleneck. However, there are still other problems to overcome. The first obstacle against the widespread use of acyclic (homopolar) machines has been the need for a large number of brushes and brush holders (due to the still very high currents to be handled because of low rotor impedance.) The second obstacle is a very low machine voltage (or rotor impedance), due to the low voltage (electromotive force) per current "turn" or path. For example, passage of current through an active conductive rotor element moving in a magnetic field, for known acyclic (homopolar) machines, rarely exceeds 20 volts per turn. This condition necessitates the use of several to many "turns" or paths, and hence a multiplicity of brushes, brush holders and slip-rings, in order to attain a practical voltage of at least several hundred volts for the overall machine.

To further provide background teaching, the points raised in one of the most comprehensive treatments of homopolar power converter structures (and heteropolar structures as well) published, given by Levi and Panzer in, "Electromechanical Power Conversion" [1974], pp. 152-200 (ch. 5, "Homopolar Converters") and pp. 201-254 (ch. 6, "Power Conversion in Heteropolar Structures: Synchronous Converters with Uniform Air Gap".), should be considered.

From the outset, in "Electromechanical Power Conversion" [1974], at p. 8 in the "Introduction", Levi states " . . . in Chap. 5. . . . We find the homopolar converter to be inherently a low-voltage, high-current device . . . . In seeking to overcome the low-impedance limitations of the homopolar converter, we discover in Chap. 6 the advantages arising from a heteropolar configuration".

In studying Levi above, we find that Chapter 5 deals most thoroughly with the symmetry aspects of cylindrical rotary homopolar structures and some of the unique characteristics associated therewith, for example, because of this symmetry, the induced Magnetic (B) field in a homopolar machine does not generate any motional electric field and that this property is peculiar to homopolar structures, and is not shared by any other structures. Further, the "armature reaction" experienced in a homopolar machine is different than that in all other structures (topologies), so that the homopolar structure is unique and at an advantage compared to other types, in that saturation effects can be easily avoided and almost completely screened out in such homopolar structures.

Chapter 5 also concludes that the homopolar machine is of high-speed, large magnetic (B) field, low-voltage, high-current; and hence inherently low-impedance in nature. Some of the final assumptions given in the summary of Chapter 5, state that, " . . . we have studied the converter type which has the greatest symmetry and uniformity: the homopolar converter." and 1.) "The electrical and mechanical performance of the converter as a whole essentially parallels that of a single volume element." and 2.) "Efficiency considerations limit this application to velocity intervals in the neighborhood of the drift velocity." and 4.) "When saturation effects are negligible, the armature reaction in endless structures does not affect the terminal voltage . . . ". The treatment of homopolar machines in Chapter 5 are typical of the treatment given to, and classification of, homopolar structures.

At the beginning of Chapter 6, p. 201, Levi states, "We begin by seeking means to overcome the rigid relation between voltage and physical dimensions in the homopolar converter, and trace the source of this inflexibility in impedance level to the uniformity of the field distribution . . . ". Subsequently, on pp. 203-207, he states that "the inherent low-impedance of the homopolar converter cannot be overcome in that series summation of the electromotive force in active conductor segments cannot be accomplished." This argument is also mentioned in further detail elsewhere in the Levi text. Essentially, Levi categorically states that the inherent problem of "bucking" or electromotive force cancellation in series connections cannot be overcome in homopolar machines, hence the subsequent diversion to heteropolar machinery (those producing AC). Levi does touch upon the "Gramme ring winding", which does effect a specific form of flux "steering" and flux "isolation", when used in a heteropolar structure in order to effect series summation. Levi indicates that only heteropolar converters are capable of impedance-matching, due to their exclusive ability to use series summation for active conductors.

In the summary of Chapter 6, Levi concludes, 1.) "The low electric impedance of the homopolar converter is inescapable. This drawback has to be overcome by resorting to polarity alternations in the gap B [field], so as to permit increased voltage by series connection of individual armature conductors. An immediate consequence of this heteropolarity is the establishment of AC quantities in the external circuit.", and also, 2.) " . . . [in heteropolar converters] . . . the average or net power per-unit surface cannot reach the same ultimate levels as in homopolar converters." [bracketed italics are the inventors additions].

We refer to Levi's treatment of the subject matter as being representative of the typical arguments and currently dominant opinions proffering the necessity, desirability and superiority of heteropolar structures over homopolar structures. However, we also note his statement of several unarguable peculiarities and advantages exhibited even by the known classical low-impedance homopolar structures.

Throughout Levi above, homopolar really meant acyclic and homopolar; one can have a homopolar structure that is not acyclic, for example, the eddy current brake on a watthour meter. To be acyclic means to be inherently homopolar.

It is an object of the present invention to provide for series connections in acyclic (homopolar) topologies through the use of "flux isolation" methods, even when active conductors and magnetically permeable components are rotating with respect to each other. This provides for the series flow of magnetomotive force producing current or the series summation of produced electromotive force in electrical conductor assemblies subject to time-invariant electrodynamic interactions that are respectively due to their translation within a magnetic field.

To the inventors knowledge, there are no known acyclic methods or apparatus which provide or utilize "flux isolation" in order to eliminate the "bucking" or reverse electromotive force induction in certain portions of series connected conductors when such an acyclic apparatus is used as a generator. Further, to the inventors knowledge, there are no known acyclic methods or apparatus which provide or utilize "flux isolation" in order to eliminate the reverse magnetomotive force produced in certain portions of series connected conductors when such an acyclic apparatus is used as a motor.

The only known electromechanical converter structure employing some form of flux "isolation", is the heteropolar converter structure having a "Gramme ring winding" on its armature. This structure allows for the translation of a conductor in a low magnetic field strength area, so that the conductor produces minimal electromotive force, allowing it to act as a return conductor in a series winding. This then allows for the use of series-connected active conductors in heteropolar machines, in order to increase output electromotive force or to increase output magnetomotive force.

An example of a Gramme ring structure is disclosed in U.S. Pat. No. 3,875,484 to Williams and Harte entitled "Travelling Field Electric Motor with Improved Stator", the entire disclosure of which is incorporated herein by reference.

In accordance with the present invention, there is provided a novel design for acyclic homopolar motors and generators that overcomes the two major problems of acyclic homopolar motors and generators of the related art, by providing obviation of the concern surrounding the voltage drop (or resistance) involved in supplying electrical power to, or removing electrical power from, such motors or generators respectively, and by increasing the magnetomotive or voltage/electromotive force per "turn" or active current path segment through series summation of magnetomotive force or electromotive force; thus creating an acyclic homopolar machine design that is inherently "high-impedance", something that has previously been, for at least 100 years, persistently taught as being impossible.

In some embodiments of the present invention, there is provided a method for the series connection of active electrical conductor assemblies subject to time-invariant electrodynamic interactions within a magnetic field, such as those found in electromechanical power converters termed acyclic and homopolar in nature.

In some embodiments of the present invention, an acyclic motor apparatus is provided that uses series connection and hence series flow of magnetomotive force producing current in active electrical conductor assemblies subject to time-invariant electrodynamic interactions that create translation within a magnetic field.

In some embodiments of the present invention, an acyclic generating apparatus is provided that uses series connection and hence series summation of the induced electromotive force in active electrical conductor assemblies subject to time-invariant electrodynamic interactions that are due to translation within a magnetic field.

In some embodiments of the present invention, an acyclic reciprocal apparatus (motor or generator) is provided that uses series flow of magnetomotive force producing current or the series summation of produced electromotive force in electrical conductor assemblies subject to time-invariant electrodynamic interactions that are respectively creating, or due to, their translation within a magnetic field.

In accordance with one embodiment of the present invention, an electromechanical power converter is provided that uses flux isolation in order to specifically ensure that non-active magnetomotive force associated conductor assemblies translating within perpendicular magnetic (B) fields do not produce reverse magnetomotive forces that would lead to magnetomotive force cancellation in series connected windings.

Also, in accordance with one embodiment of the present invention, an electromechanical power converter is provided that uses flux isolation to ensure that non-active electromotive force associated conductor assemblies translating within perpendicular applied magnetic (B) fields do not generate a bucking or reverse electromotive force that would lead to electromotive force cancellation in series connected windings.

One embodiment of the present invention also provides desired impedance characteristics of active electrical conductor assemblies subject to time-invariant electrodynamic interactions within a magnetic field, such as those found in electromechanical power converters termed acyclic or homopolar in nature.

In accordance with one embodiment of the present invention, there are provided techniques for reducing the large $I^2R$ losses normally associated with the magnetomotive force or electromotive force producing assemblies in classical acyclic or homopolar electromechanical power converters.

Also in accordance with one embodiment of the present invention, there are provided techniques for reducing the large $I^2R$ losses normally associated with the collector-brush and slip-ring assemblies in classical acyclic or homopolar electromechanical power converters.

Also in accordance with one embodiment of the present invention, there are provided techniques for reducing the physical dimensions normally associated with the magnetomotive force or electromotive force producing assemblies in classical acyclic or homopolar electromechanical power converters.

Also in accordance with one embodiment of the present invention, there are provided techniques for reducing the angular output or input velocities normally associated with the magnetomotive force or electromotive force producing assemblies in classical acyclic or homopolar electromechanical power converters.

When used as a generator, the various embodiments of the present invention will provide for alternating current electromotive force generation if the field is energized therewith; essentially providing rotary transformer action in the conversion of mechanical power to electrical. When used as a motor, the various embodiments of the present invention will function using alternating current inputs if the field is energized with alternating current and the armature is also alternating current or switched direct current energized. However, in either case, one must anticipate the creation of eddy currents and must resort to the use of laminated structures in order to minimize their effects, much as must be done in conventional cyclical machines.

BRIEF SUMMARY OF THE INVENTION

An electromechanical power converter comprising a frame comprising field coils and a shaft disposed between the field coils; and a rotor cylinder coupled to said shaft, the rotor cylinder comprising a plurality of conductor elements connected in series by superconducting series connections.

BRIEF DESCRIPTION OF THE DRAWINGS

The invention will be described by reference to the following drawings, in which like numerals refer to like elements, and in which.

Figure 1:
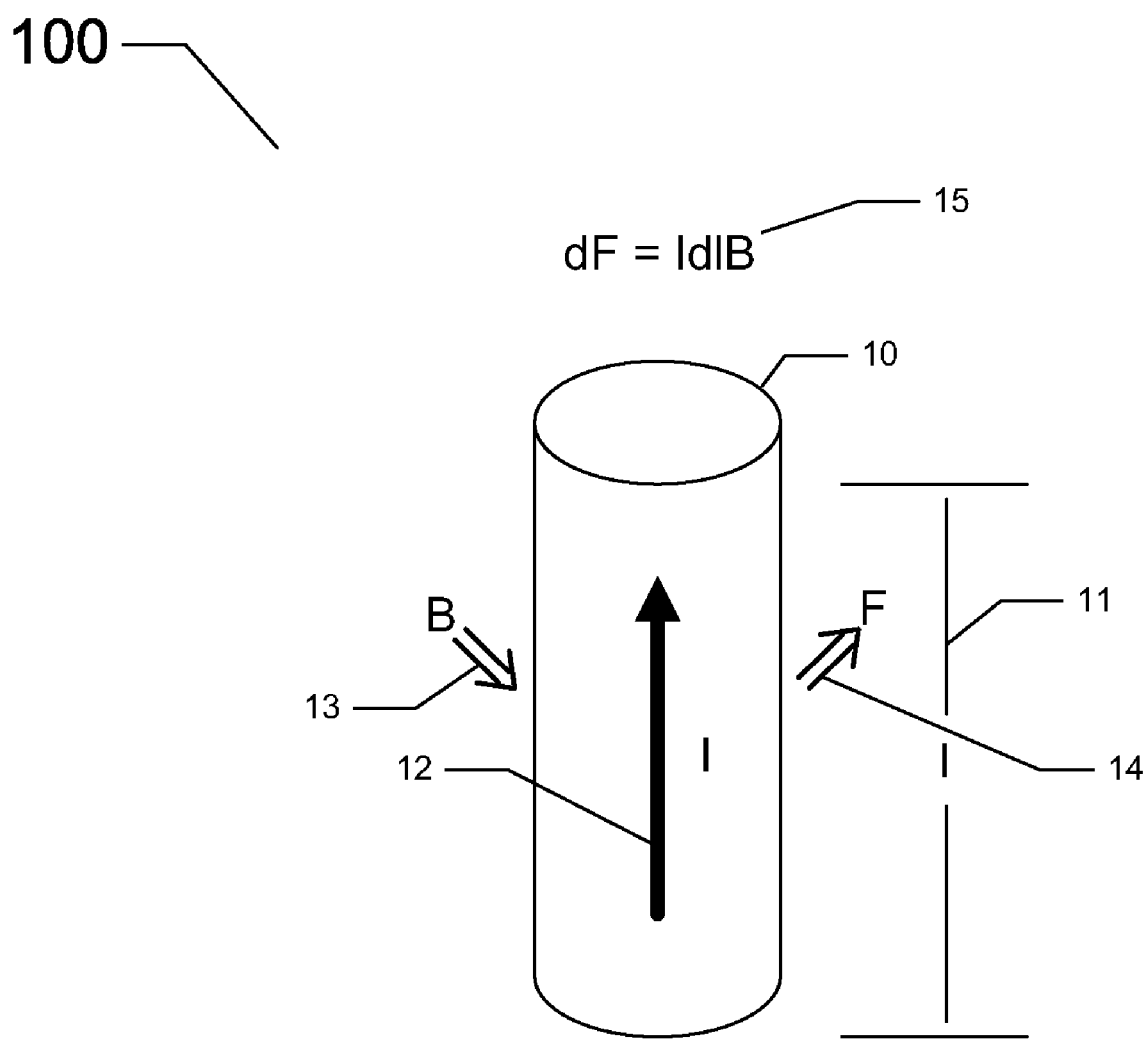
FIG. 1 is a schematic representation of the classical electrodynamic concept of magnetomotive force (MMF) produced by a current flowing along a conductive element located within a uniform perpendicularly applied magnetic field.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by this specification and the claims herein.

DESCRIPTION OF THE PREFERRED EMBODIMENTS

For a general understanding of the present invention, reference is made to the drawings. In the drawings, like reference numerals have been used throughout to designate identical elements.

Overview of Electrodynamic Concepts

A brief overview of electrodynamic concepts is presented here to fully enable one skilled in the art to make and use the invention.

Shown in FIG. 1 is an illustration of the classical electrodynamic concept of current flow produced magnetomotive force (MMF) over the length of a conductive element located within a uniform perpendicularly applied magnetic field. In this figure, there is a conductive element 10, of length "l" 11, said conductive element 10 having a current flow "I" 12 therein along its length "l" 11, and being situated in a uniform externally applied magnetic (B) field 13. The current flow "I" 12 (which is due to a current density J comprised of moving charge carriers, nominally q- or electrons in this case) experiences a net force "F" 14 in a vector direction mutually perpendicular to the "B" field vector 13 and the current flow "I" direction 12. This force "F" 14 is transferred or coupled to the more or less rigid lattice of the conductive element 10 via the classical viewpoint of collisions between the electrons comprising said current flow "I" 12 and the lattice of said conductive element 10, said conductive element 10 thereby indirectly experiencing the net force "F" 14. This is usually referred to as the "Lorentz force" and is given by the differential equation dF=IdlB which is depicted as expression 15 in FIG. 1. The quantum electrodynamic viewpoint of force coupling between the charge carriers and the lattice involves wavefunction interactions and eliminates eventual problems with the simplistic classical viewpoint (such as accounting for superconductivity above absolute zero etc.)

The reason the moving charges experience the Lorentz force is that the magnetic field of a moving charge interacts with the applied magnetic field, resulting in a change in the moving charge trajectory (with no gain or loss of kinetic energy.) In the presence of an accelerating electric (E) field such as is found in a conductive element across the length of which an electromotive force potential is applied, the charges gain kinetic energy in the general direction of the applied E field vector, which in the absence of an externally applied magnetic field is usually given up to or lost to or transferred to the lattice (via collision or wavefunction interaction), said kinetic energy gain by the lattice (which is totally random) resulting in simply an increase in its temperature (vibration, phonon transfer etc.) This is normally referred to as "Joule heating" or "Joule loss". However, upon the application of an external magnetic field, the moving charges modify their trajectory into a "cycloid" between lattice interactions, said cycloid trajectory having a net vector that is mutually perpendicular to the direction of said applied magnetic field and to the direction of displacement due to said E field vector and resultant net current flow.

Figure 2:
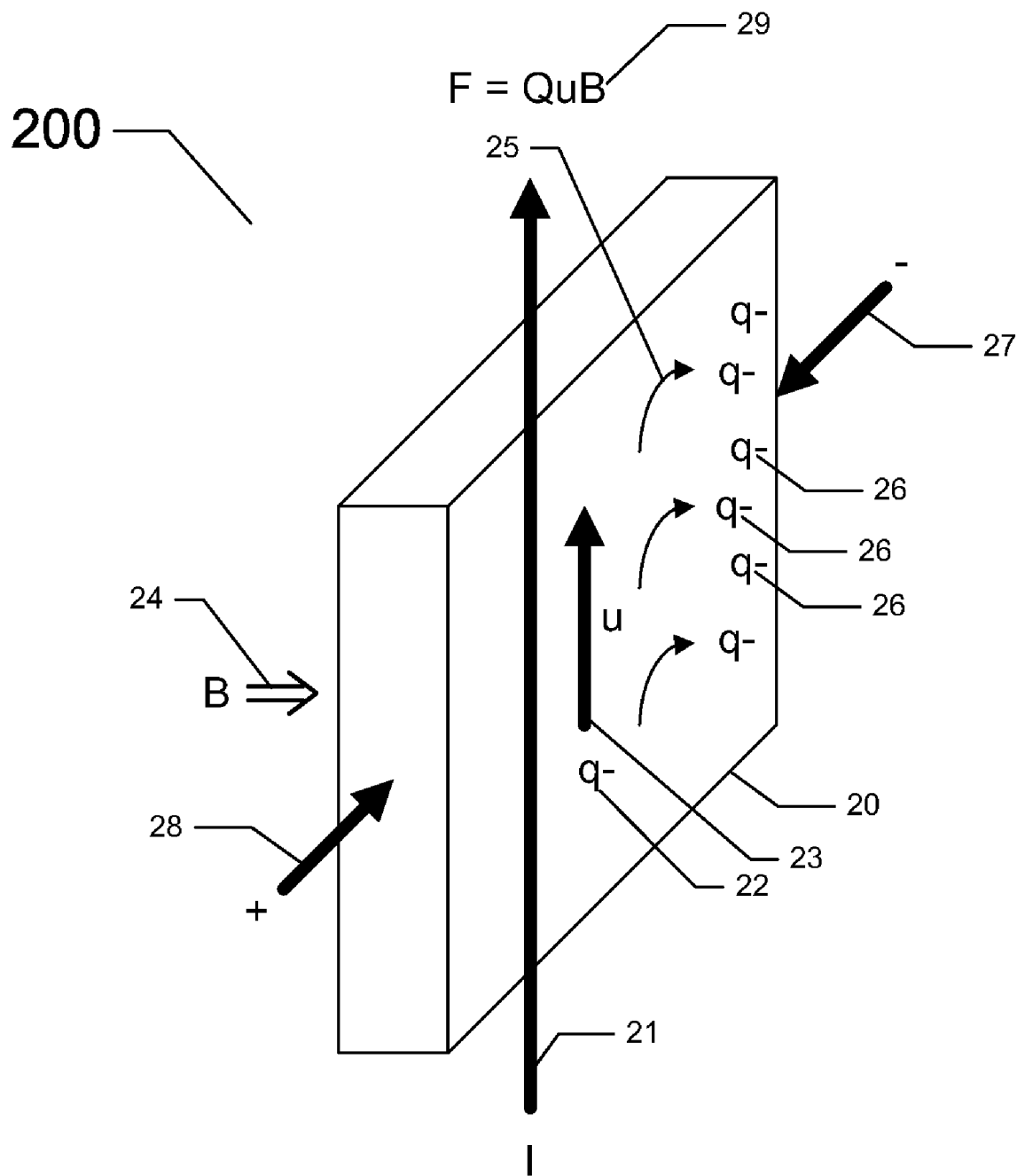
FIG. 2 is a perspective schematic representation of the Hall effect in a rectangular and planar conductive element located within a uniform perpendicularly applied magnetic field.

Referring now to FIG. 2, a perspective schematic representation of the Hall effect in a rectangular and planar conductive element located within a uniform perpendicularly applied magnetic field is illustrated. The Hall effect is directly due to the Lorentz force described by way of FIG. 1 above. As shown, there is a substantially rectangular and planar electrically conductive element or sheet 20, having a net current flow "I" 21 therein/through, said current flow "I" 21 consisting of a multitude of moving charge carriers "q-" 22 (i.e., electrons), moving at a nominal displacement (or drift) velocity "u" 23, at right angles to an externally applied uniform magnetic field "B" 24. The Lorentz force interaction causes trajectory modification 25 to said multitude of moving charge carriers "q-" 22, resulting in a net accumulation 26 of said negative charge carriers at one end of said element 20. In this case, the Lorentz force interaction of said charge carriers is given by F=QuB which is depicted as expression 29 in the drawing figure.

Correspondingly, if an electromotive force potential (EMF) measurement were to be made transversely across the element 20, at the points 27 and 28 indicated in the drawing, one would measure an electromotive force potential or gradient due to said imbalance in negative charge carriers across said element 20, leading to a positive potential at point 28 and a negative potential at point 27. This potential is also referred to as the "Hall voltage" or "Hall potential". A net force will also be felt by the lattice due to the above. The Hall voltage is usually not easily observed nor considered in circular conductors as used in electrical machinery because it is very, very small. In addition, the Hall effect is the source of eddy currents or Foucalt currents when a conductive element is in motion in a magnetic field.)

Figure 3:
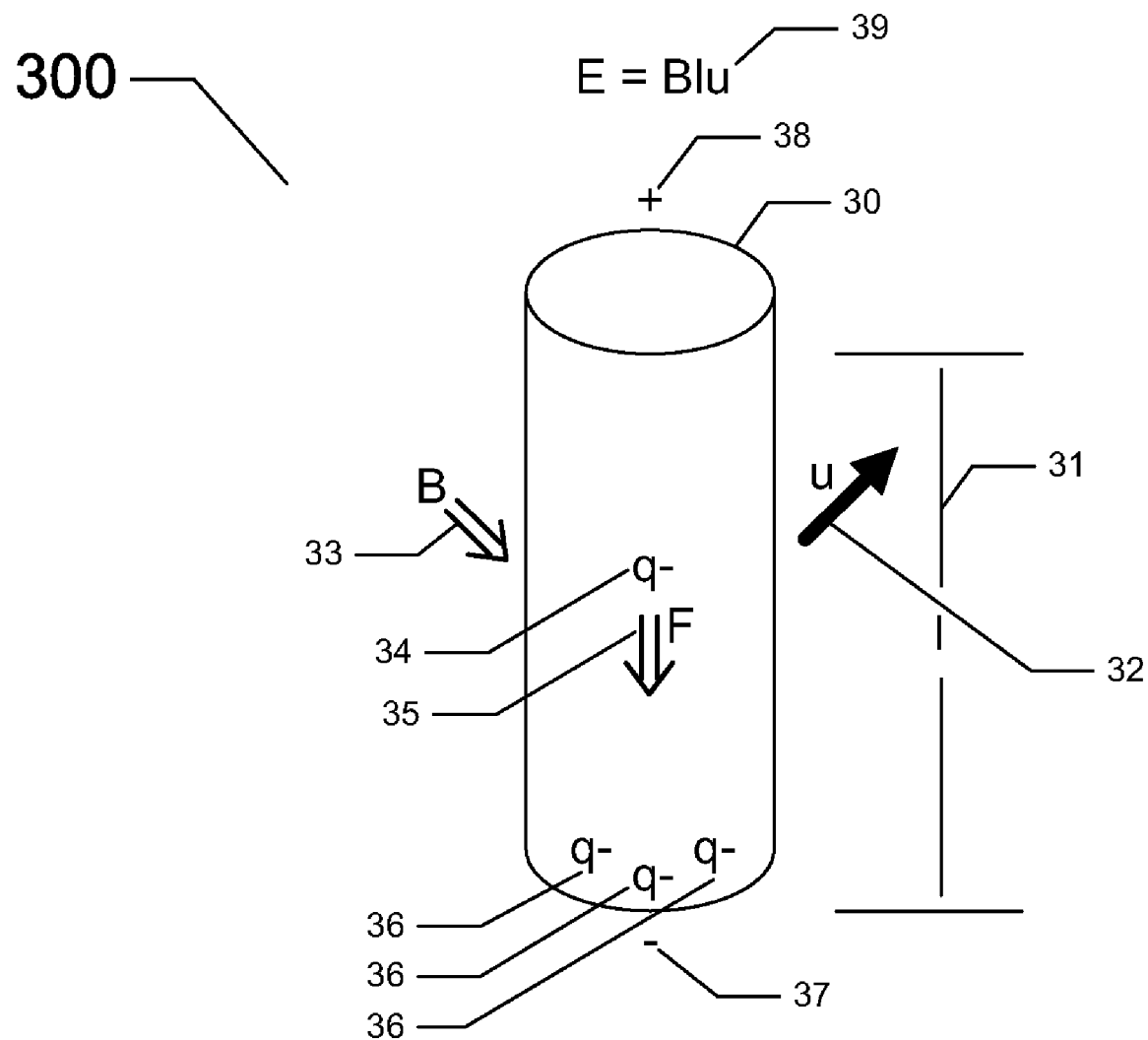
FIG. 3 is a schematic representation of the classical electrodynamic concept of electromotive force (EMF) that is produced along the length of a conductive element that is translating through a uniform perpendicularly applied magnetic field.

Referring now to FIG. 3, a schematic representation of the classical electrodynamic concept of electromotive force (EMF) that is produced along the length of a conductive element that is translating through a uniform perpendicularly applied magnetic field is depicted. There is shown a conductive element 30, having a length "l" 31, said element 30 being in uniform perpendicular translation at velocity "u" 32, through an externally applied uniform magnetic field "B" 33. Said conductive element 30 contains negative charge carriers q- 34 (here presumed to be electrons, i.e., Fermi gas of electrons etc.) which are free to move around within the lattice of said conductive element 30.

The charge carriers 34 experience the Lorentz force interaction "F" 35 (as previously described by way of FIGS. 1 and 2), and lead to an accumulation of negative charge carriers 36 at one end of the conductive element 30. The net effect of this will be an observable electromotive force (EMF) potential across the ends of conductive element 30 of length "l" 31 while it is in motion through said magnetic field "B" 33, said electromotive force potential being positive at one end 38 (due to a deficiency of negative charge carriers) and negative at the other end 37 (due to an excess of negative charge carriers.)

The magnitude of said electromotive force potential due to the Lorentz force interaction of the charge carriers is given by E=Blu which is depicted as expression 39 in FIG. 3. (Note: in the absence of a continuous (closed) current path to the outside of the conductive element, the lengthwise displacement of negative charge carriers will continue until the Coulomb force due to the electromotive force potential gradient within the conductive element just balances out the Lorentz force interaction.)

Figure 4:
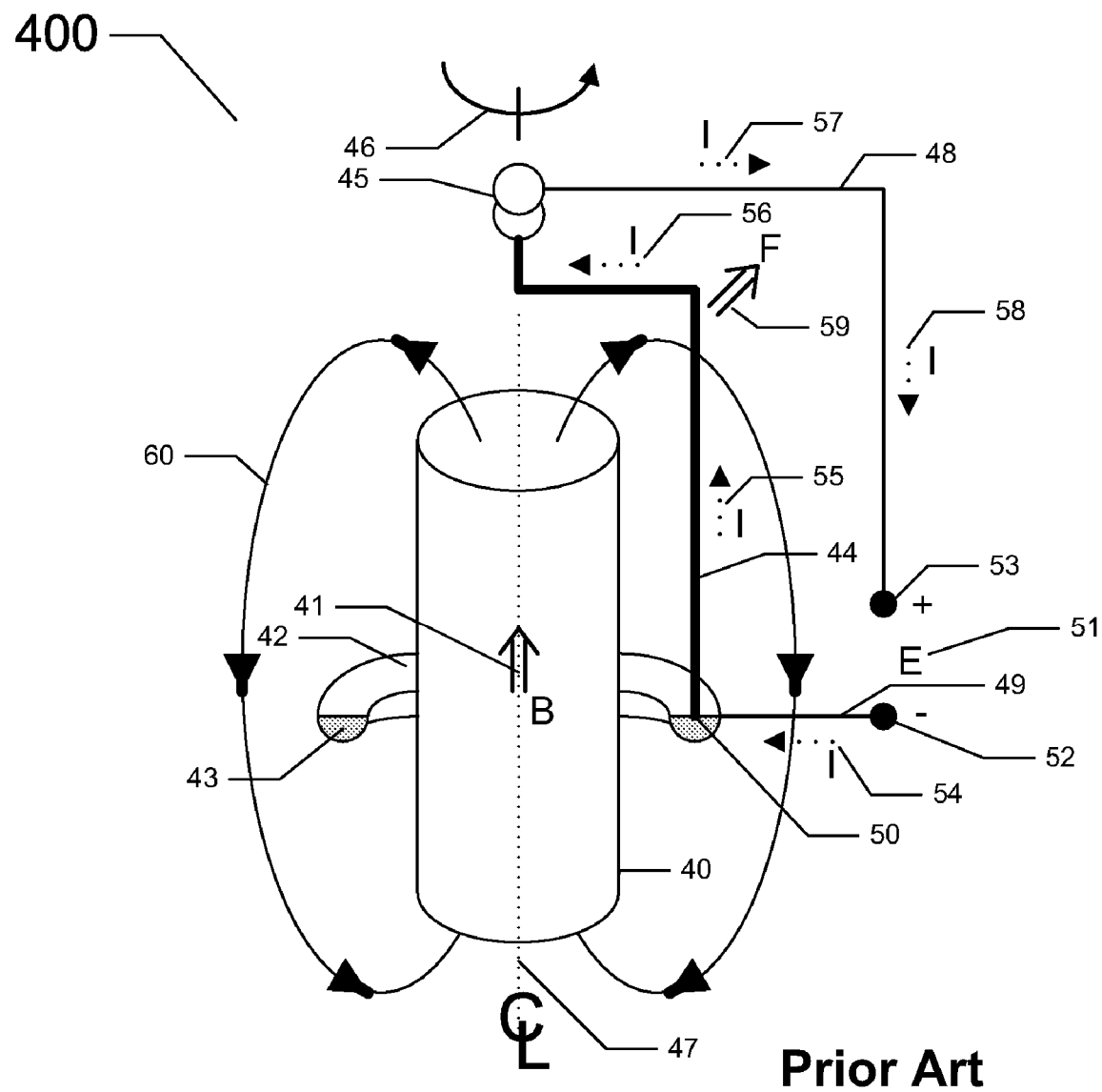
FIG. 4 is a schematic representation of a prior art homopolar and acyclic apparatus according to Faraday.

Referring now to FIG. 4, a schematic representation of a prior art homopolar and acyclic apparatus according to Faraday is shown. This apparatus is considered to be the world's first rotary electromagnetic machine. Shown is a magnetically permeable member 40, such as a permanent magnet, producing a magnetic flux field 41 about said member 40. The flux field 41 can be seen to be radially symmetric and uniform (about centerline 47) as shown by artificial flux field lines 59 and 60. Said member 40 is surrounded by a trough 42 containing an electrically conductive liquid 43 (such as Hg.) An electrical conductor 44 is suspended from an electrically conductive swivel joint 45 in such fashion as to be able to freely rotate about said centerline 47 of said magnetically permeable member 40, and hence is free to translate through (rotate therethrough) said member 40's magnetic flux field as indicated by 46.

An electrical circuit is next completed through this apparatus, wherein the bottom end of said electrical conductor 44 makes contact with (dips into) the conductive liquid 43 in trough 42 at 50, and is brought out to a negatively denoted terminal 52 via stationary conductor 49 which is also in contact with said conductive liquid 43. The top end of electrical conductor 44 is connected via said electrically conductive swivel joint 45 and stationary conductor 48 to a positively denoted terminal 53.

The operation of this prior art apparatus will now be described with the aid of the above described FIG. 4. A source of electromotive force 51 (EMF) is applied across said terminals 53 and 52, these being positive and negative respectively. Consequently, an electric current will flow through the apparatus, as shown by "I" 54, from said negative terminal 52 through said conductor 49, into said conductive liquid 43, then through said electrical conductor 44 as shown by "I" 55 and "I" 56, then through said swivel 45 and finally through stationary conductor 48 as shown by "I" 57 and 58 to said positive terminal 53. The vertical flow of current "I" 55 and 56 in electrical conductor 44 (which is free to rotate) leads to said electrical conductor 44 experiencing the Lorentz force "F" 59, in the same manner as was described in FIG. 1 above. Since said electrical conductor 44 is constrained to rotate or swivel only about said centerline 47 of the uniform and radially symmetric magnetic flux field 41, 59 and 60, said electrical conductor will perform a continuous uniform rotational translation thereabout, in essence performing the conversion of electrical power into mechanical work, by utilizing the Lorentz force interaction as a force vector modifying intermediary. The apparatus of FIG. 4 is essentially a rotary electromechanical power converter known as a motor. Further, the apparatus performs work without requiring commutation or switching of said electric current flow, and does not exhibit any time-variant electrodynamic interactions (on the macroscopic scale), and is homopolar in form and is also acyclic in nature and action. This apparatus is reciprocal, where it will generate an electromotive force when driven mechanically.

Figure 5:
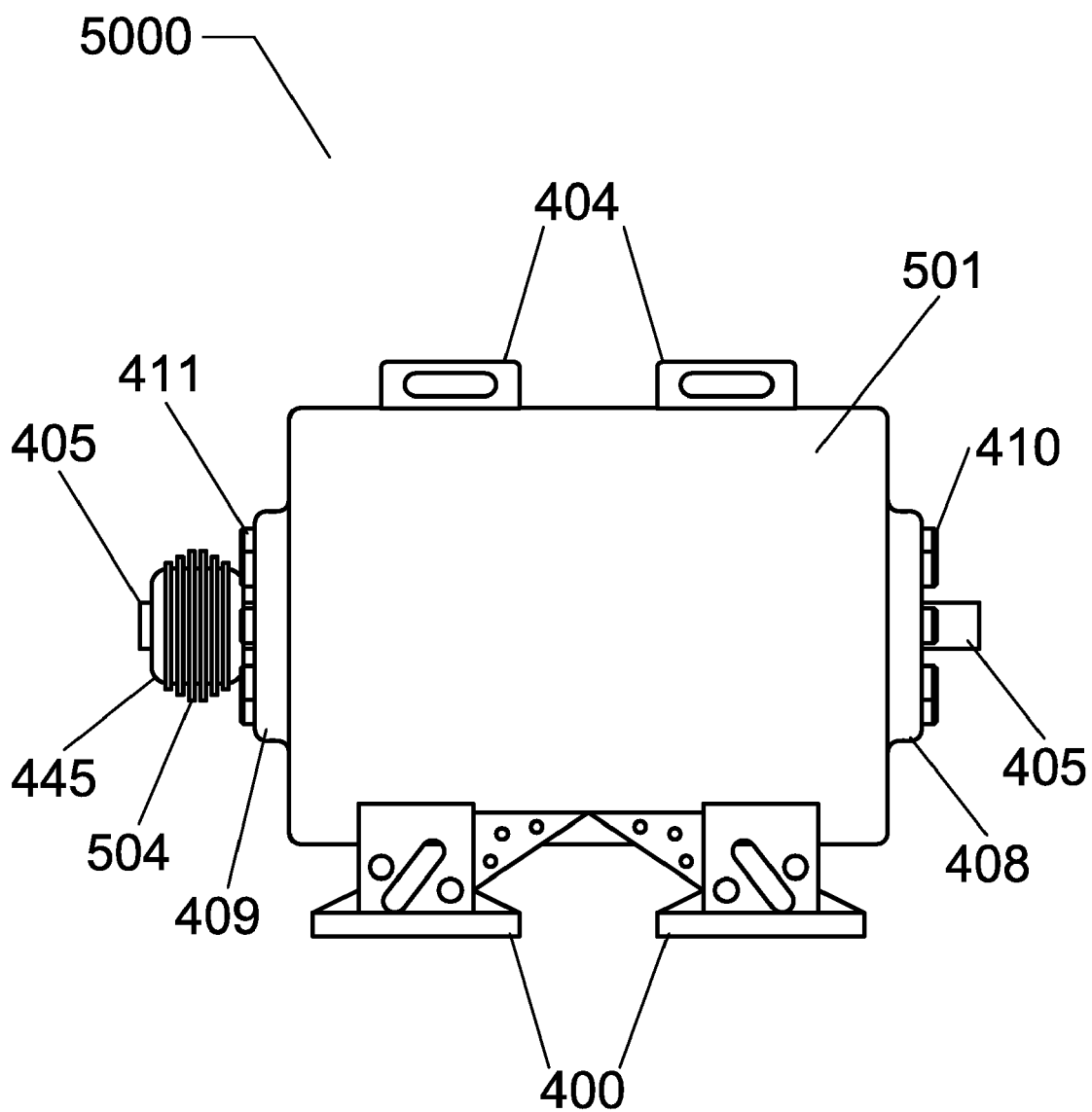
FIG. 5 is a side view of the superconducting acyclic homopolar electromechanical power converter.

Referring now to FIG. 5, a side view of the superconducting acyclic homopolar electromechanical power converter is shown. A frame 501 provides mechanical integrity to the inner workings of the electromechanical power converter, and may be made from a metal such as iron, steel, brass, or the like. The frame 501 may also be connected to a stand 400 for mounting and support of the electromechanical power converter. Frame hooks 404 may also be provided in some embodiments of the present invention to assist with moving and placement of the electromechanical power converter. Also shown in FIG. 5 is a shaft 405, end caps 408 and 409, bolts 410 and 411, and a cryocooler 445 with fins 504. Each of these elements will be further described by way of subsequent drawings that clearly illustrate the inner workings of the electromechanical power converter in such a way as to allow one skilled in the art to make and use the invention.

Figure 6:
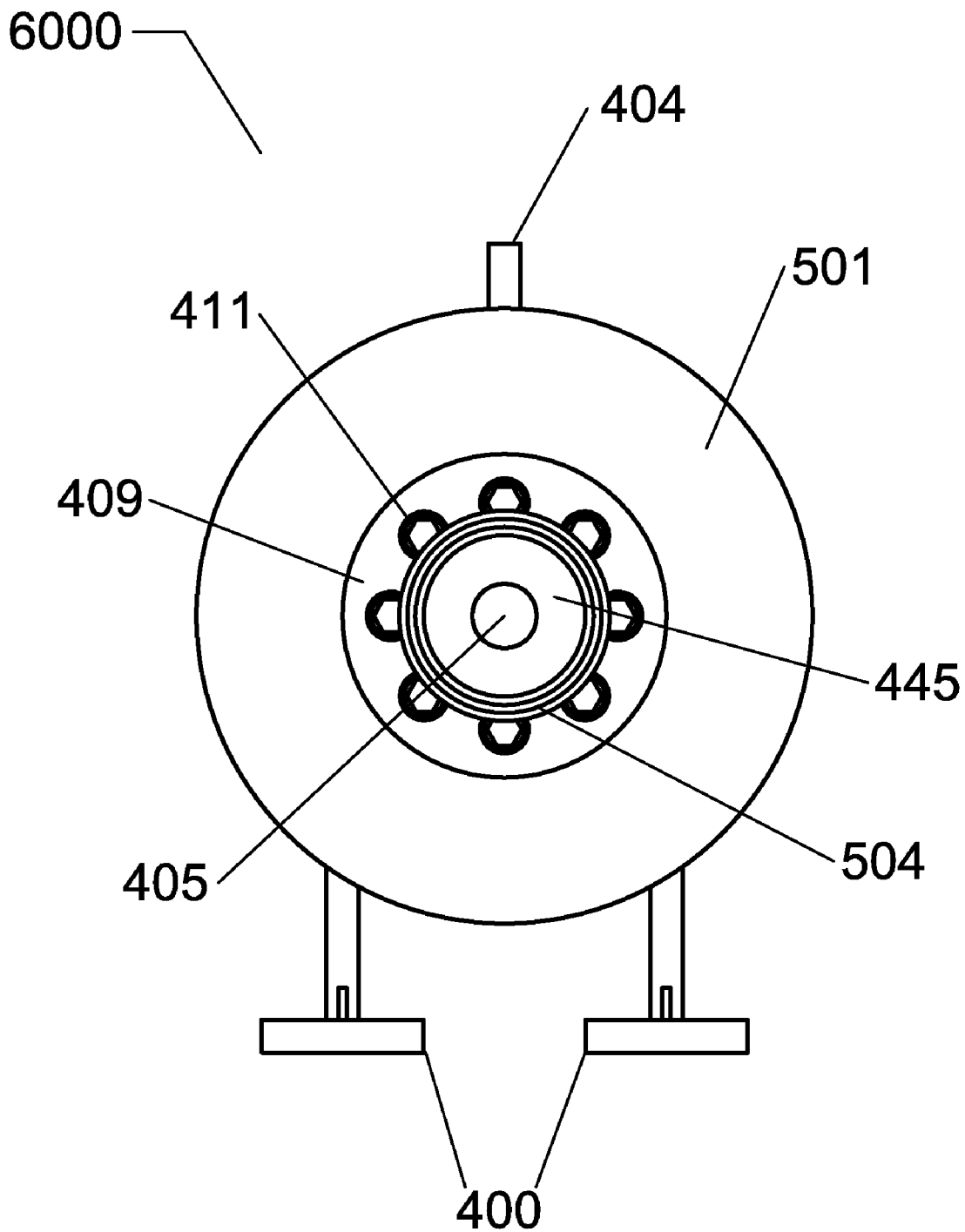
FIG. 6 is an end view of the superconducting acyclic homopolar electromechanical power converter.

Referring now to FIG. 6, an end view of one embodiment of the superconducting acyclic homopolar electromechanical power converter is shown. A cryocooler 445 is depicted with cryocooler fins 504. The crycooler 445 in some embodiments of the present invention co-rotates with the shaft 405, and serves to cool superconducting connections within the electromechanical power converter. A cryocooler is a low temperature refrigerator used to cool, for example, infrared detectors, medical instruments, and superconducting devices. Cryocoolers are known to those skilled in the art. Examples of cryocoolers are those made by Janis Research (www.janis.com), Shi Cryogenics (shicryogenics.com), and Ball Aerospace (www.ballaerospace.com). FIG. 6 also shows several mechanical features of the electromechanical power converter such as the frame 501, stand 400, frame hooks 404, end cap 409 and end cap bolts 411.

Figure 7:
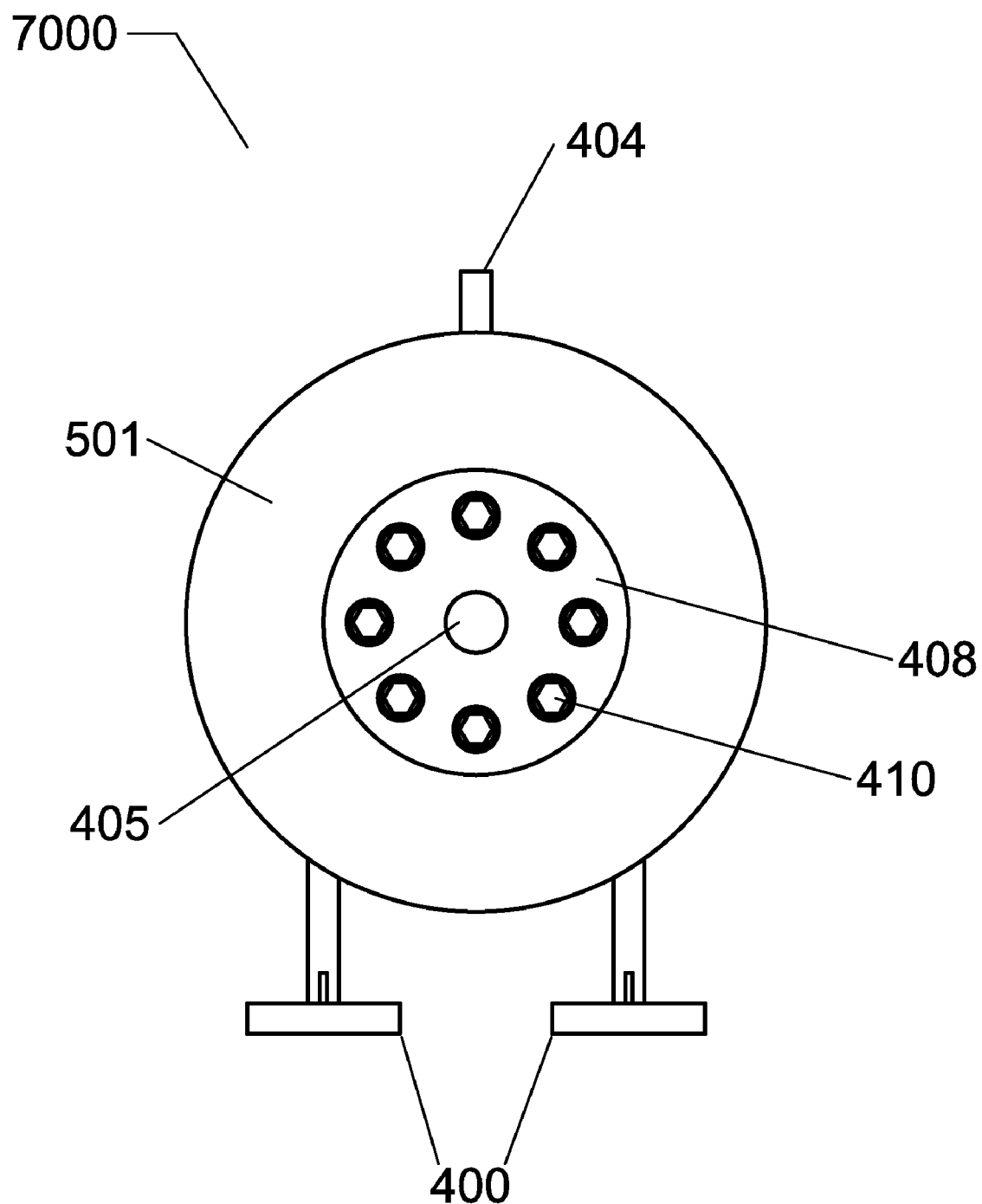
FIG. 7 is an opposing end view of the superconducting acyclic homopolar electromechanical power converter.

Turning now to FIG. 7, an opposing end view of one embodiment of the superconducting acyclic homopolar electromechanical power converter is shown. The frame 501 containing a stand 400 and, in some embodiments of the present invention, hooks 404, and end caps, with end cap 408 being visible in FIG. 7. End caps may be made from a metal such as steel, iron, brass, or the like. The end cap 408, as will be further described later in this specification, serves to retain bearings and the shaft 405. The shaft 405 may be made from a ferromagnetic material such as steel, hardened steel, iron, or the like. The shaft 405 provides a mechanical interface between mechanical energy and electrical energy. The end cap 408 is retained by a series of bolts 410.

Figure 8:
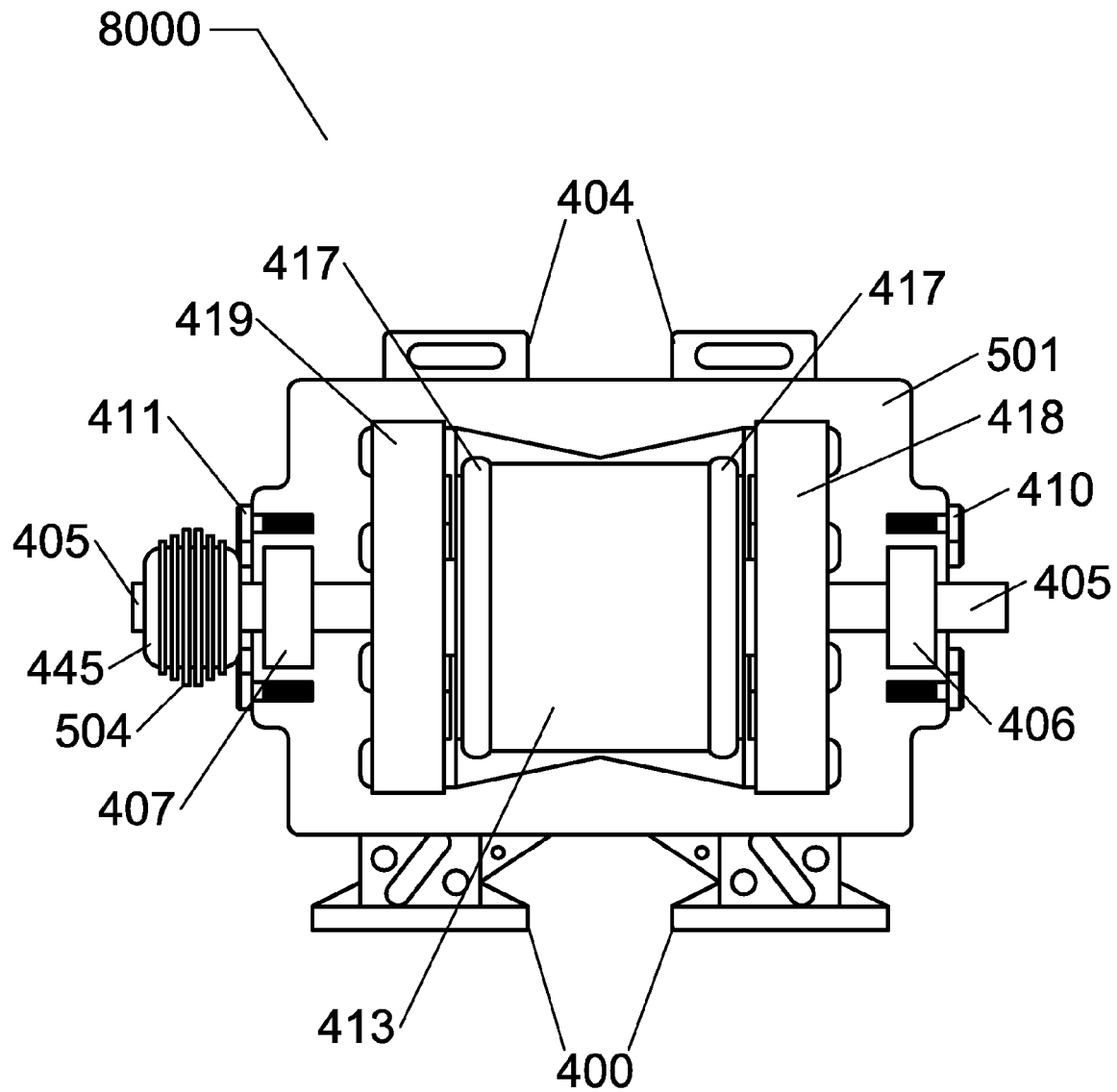
FIG. 8 is a cutaway view of the superconducting acyclic homopolar electromechanical power converter.

To fully understand the inner workings of the electromechanical power converter, the remaining figures provide cutaway views with various components removed for clarity. FIG. 8 is a cutaway view of the electromechanical power converter showing the inner components intact. Some components are hidden from view in this figure, but will become clear in progressive illustrations as various internal components are progressively removed for illustrative purposes.

Referring now to FIG. 8, a cross sectional view of one embodiment of the present invention is depicted, showing a rotor cylinder 413 that is mechanically attached to the shaft 405 by magnetically non-permeable spokes or spider members (not shown), this entire assembly being free to be in rotational translation within an axially and radially symmetric magnetic field to be described later. The rotor cylinder 413 is made from a material with structural integrity such as steel, and contains a plurality of conductor elements (not shown) connected in series by superconducting series connections (not shown). The design of this superconducting rotor assembly will be further described by way of FIG. 10 later in this specification. The active conductor members are electrically insulated from the rotor cylinder 413 and from each other. The active conductor members are connected in series at the opposing ends of the rotor cylinder 413 in order to provide a series connected winding arrangement. The series connections, as will be further described, are comprised of High Temperature Superconducting (HTS) material, said High Temperature Superconducting (HTS) series connections being disposed within cryogenically cooled dewar jackets 417 that are circumferentially disposed around the rotor cylinder 413. In some embodiments of the present invention, the series connections are comprised of Low Temperature Superconducting material, or Superconducting material.

Further shown in FIG. 8 are the outer field coil portions 418 and 419. The coil portions are made of conventional copper (Cu) winding construction, as known to those skilled in the art. In some embodiments of the present invention, the coil portions are made of Superconducting material and form. To retain the shaft 405 and associated rotor assembly, bearings 406 and 407 are employed.

The embodiment of the present invention as heretofore described utilizes magnetic flux exclusion/isolation/insulation within said HTS series connections and produces magnetomotive force or electromotive force through flux interaction only along two (2) long winding faces of the active armature winding segments, the one active segment being exterior to said cylinder and the other active segment one being interior thereto. The overall armature winding arrangement provides for the summation of magnetomotive forces (MMFs) when used as a motor, with electrical power input conversion to mechanical power output appearing on said shaft, or for the summation of electromotive forces (EMFs) if used as a generator, with mechanical power input to said shaft being converted to electrical power output from said armature winding arrangement.

This embodiment of the present invention provides for increased volumetric power density over known prior art acyclic machinery due to reduced brush losses and reduced $I^2R$ losses. This embodiment also provides for what is basically a two-terminal machine whose impedance can be matched as desired to any application, and which does not suffer from high losses neither within the active rotor arrangement, nor in the electrical power supply coupling. This device is reciprocal in operation (generator or motor), does not require commutation and does not exhibit any time-variant electrodynamic interactions, and is homopolar in form and acyclic in nature and action.

Figure 9:
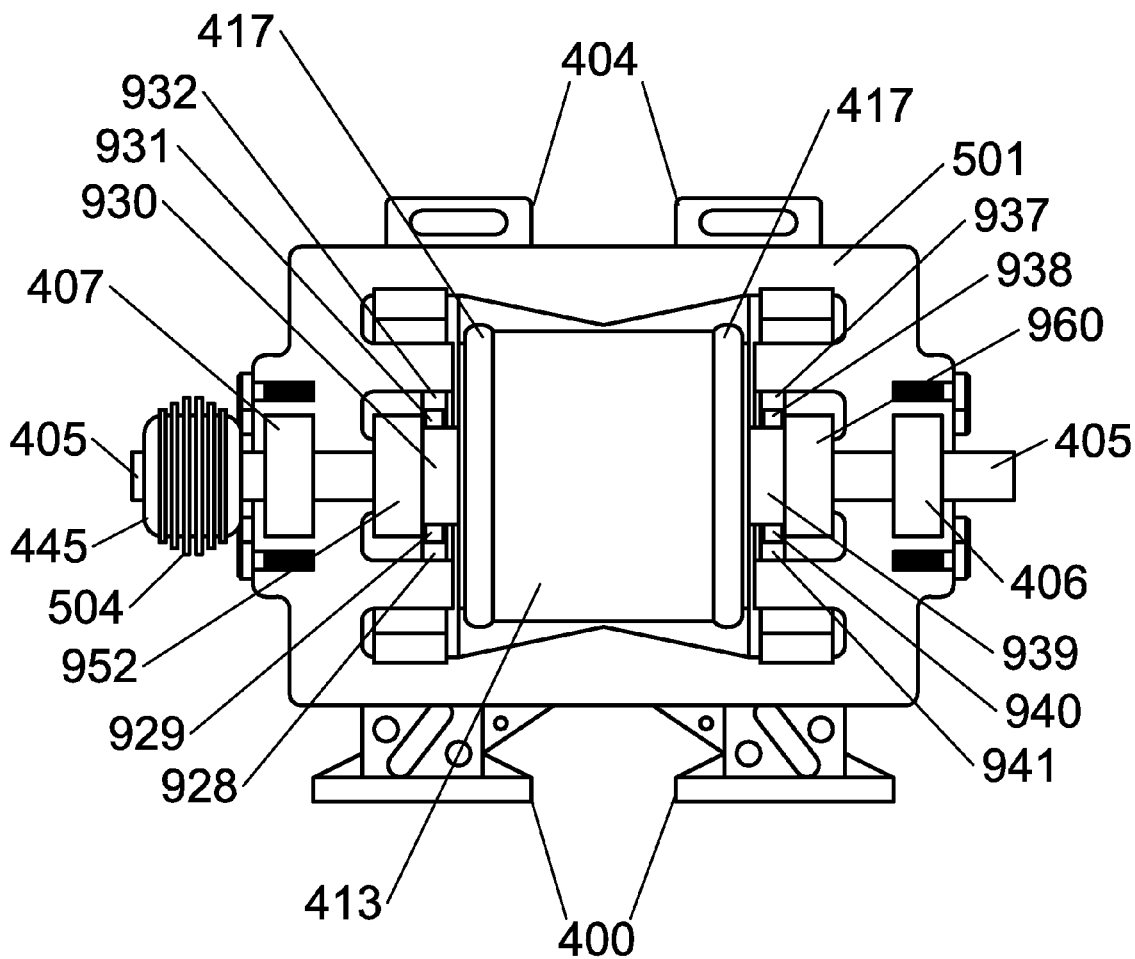
FIG. 9 is a cutaway view of the superconducting acyclic homopolar electromechanical power converter with the outer field coils cutaway.

Turning now to FIG. 9, a cutaway view of the superconducting acyclic homopolar electromechanical power converter is shown with the outer field coils removed. This view shows the use of conventional brush interfaces (i.e., current supply/collector assemblies) on the exterior of the machine. As shown, the brush holders 928, 932, 937, and 941 are affixed to the frame 501. Within the brush holders are contained spring-loaded brushes 929, 931, 938, and 940. The brushes are affixed with electrical contacts (not shown). The brushes serve to provide sliding electrical contact with the two slip rings 930 and 939, which are rigidly mounted upon and co-rotate with the shaft 405. The slip rings can therefore provide for an electrical connection to the interior of said machine via electrical contacts, thereby delivering power to the rotating armature, external electrical machine connections being made separately to the stator field coil assembly and said current collector/supply assemblies. In some embodiments of the present invention, brushes and slip rings may be replaced with a brushless exciter (high-frequency electromagnetic AC field coupler) to provide electrical power to the interior of the electromechanical power converter and to the series connected active conductor arrangement (the armature winding), The brushless exciter may, in some embodiments of the present invention, supply electrical power to the cryocooler 445. Also shown in FIG. 9 are inner field coils 952 and 960. The coil portions are made of conventional copper (Cu) winding construction, as known to those skilled in the art. In some embodiments of the present invention, the coil portions are made of Superconducting material and form.

Figure 10:
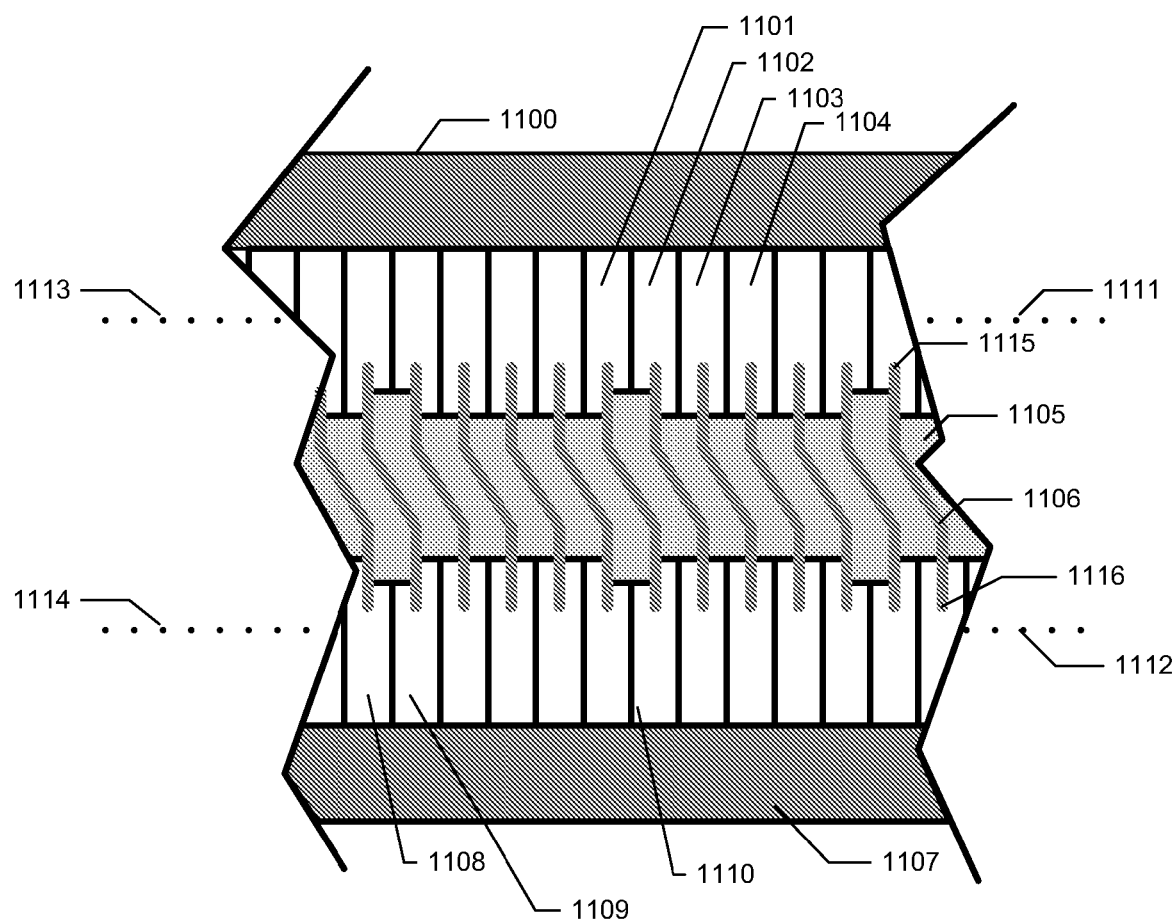
FIG. 10 is a sectional view of the rotor cylinder showing the conductor elements and superconducting series connections.

Now shown in FIG. 10 and illustrated schematically is a sectional view of the rotor cylinder showing the conductor elements and superconducting series connections. The active conductor elements, made of a conductive material such as copper, 1101, 1102, 1103, 1108 and 1109 are arranged on both the exterior and interior of the magnetically permeable rotor cylinder 413 (not shown in FIG. 10, refer to FIG. 9), the active conductor elements being substantially planar and rectangular in form and running along the transverse length of the rotor cylinder 413 (not shown in FIG. 10, refer to FIG. 9), and also being electrically insulated from one another, from the rotor and from its adjacent neighbors, via the action of a suitably formed insulating layer 1104, 1110 thereupon having a nominal breakdown voltage (i.e., dielectric strength) of more than 5 to 50V per insulating layer. An example of an insulating layer is $Cu_2O$ formed on copper elements.

The active conductor elements are shown in FIG. 10 as being grouped into sets of five, however, other embodiments of the present invention may use different numbers of sets, as determined by an analysis of the mechanical forces coupled to and from the rotor. The end elements 1101, 1102, 1108 and 1109 respectively of each group or set are shaped as to positively mechanically engage and be seated into slots in the rotor cylinder 1105, and to thereby provide for mechanical force coupling.

Also shown in FIG. 10 are the cryogenically cooled High Temperature Superconducting (HTS) series connections 1106 within their dewar jackets 1100 and 1107. The High Temperature Superconducting (HTS) series bars serve to electrically series connect two active conductor elements. The shown High Temperature Superconducting (HTS) series bars exhibit partial screening currents and attendant flux fields (such as the Meissner-Ochsenfeld effect, which is quantum thermodynamic/electrodynamic in nature) in a very thin outer layer or sheath (<50 nm in thickness) when cooled to below their Critical Temperature ($T_c$) and when in the presence of a magnetic field that is less than their upper critical field $H_{c2}$ (some HTS materials have an upper critical field of $H_{c2}>10T$), but greater than their $H_{c1}$ (called the mixed state), thereby excluding some, but not all, exterior applied magnetic flux from their interior volume.

When the HTS series bars are below $T_c$ and in the presence of an exterior applied magnetic field that is less than their $H_{c1}$, the screening currents serve to exclude all magnetic flux from their interior volume (i.e., the screening currents have no coupling to the lattice and the interior conduction CP/electrons behave as they might in vacuum, but without experiencing any Lorentz force.

Figure 11:
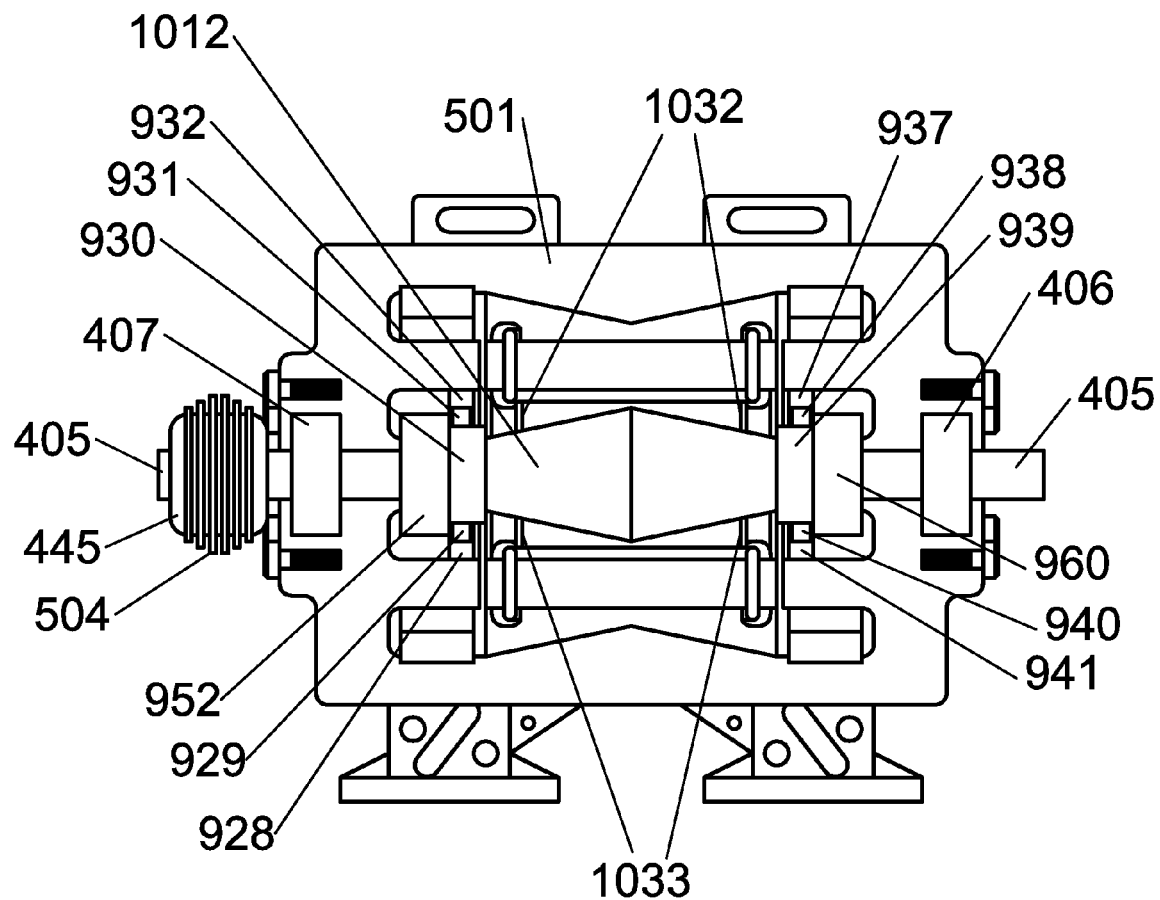
FIG. 11 is a cutaway view of the superconducting acyclic homopolar electromechanical power converter with the outer field coils and the rotor cylinder cutaway to show the rotor center core.

FIG. 11 shows a cutaway view of the superconducting acyclic homopolar electromechanical power converter with the outer field coils removed and the rotor cylinder cutaway to show the rotor center core 1012. The rotor center core 1012 is made from magnetically permeable material, and is attached to the shaft 405. The rotor center core 1012 and shaft 405 are mechanically coupled to the rotor cylinder 413 (see FIG. 9) using materials such as magnetically non-permeable spokes or spider members (not shown); this entire assembly being free to be in rotational translation within an axially and radially symmetric magnetic field.

Figure 12:
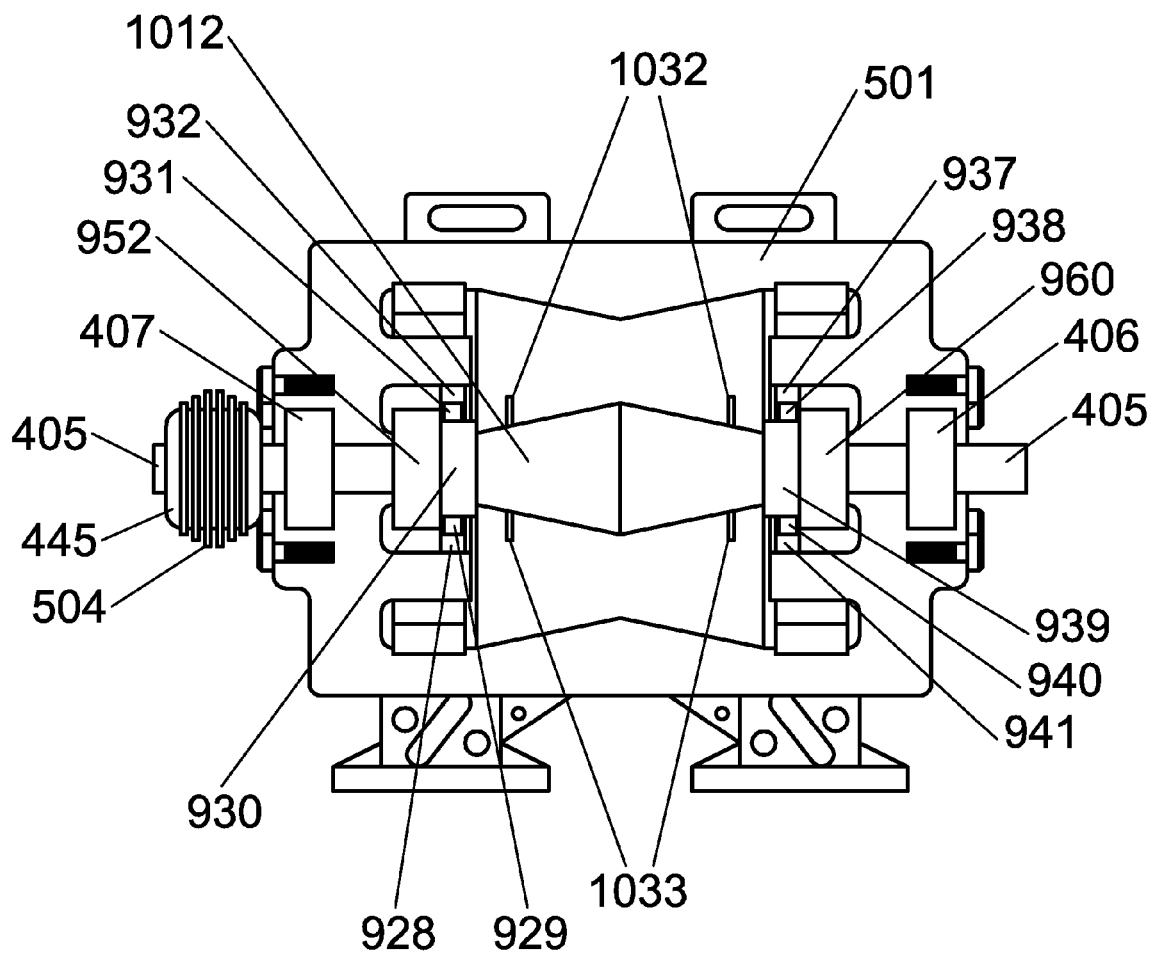
FIG. 12 is a cutaway view of the superconducting acyclic homopolar electromechanical power converter with the outer field coils cutaway and the rotor cylinder removed to show the rotor center core and cryogenic tubing.

FIG. 12 shows a cutaway view of the superconducting acyclic homopolar electromechanical power converter with the outer field coils and the rotor cylinder removed to show the rotor center core and cryogenic tubing. The cryocooler 445, as previously described, may be mounted to the frame 501. The cryocooler 445 may also contain cryocooler fins 504. The cryocooler 445 may be electrically powered from a suitable electrical supply. The cryogenic cooler 445 supplies a flow of coolant to and from the interior of the machine via circulation channels containing cryogenic feed tubing 1032 and cryogenic return tubing 1033 within the shaft 405. In some embodiments of the present invention, the cryocooler 445 is not mounted to the frame 501, but co-rotates with the shaft 405. The interior volume of the machine frame (stator interior) being cooled via the cryogenic coolant, the coolant circulating freely throughout the stator interior via the cryogenic feed tubing 1032 and the cryogenic return tubing 1033 from the stator interior. Seals (not shown) may be used on the shaft, and on portions of the armature rotor.

Figure 13:
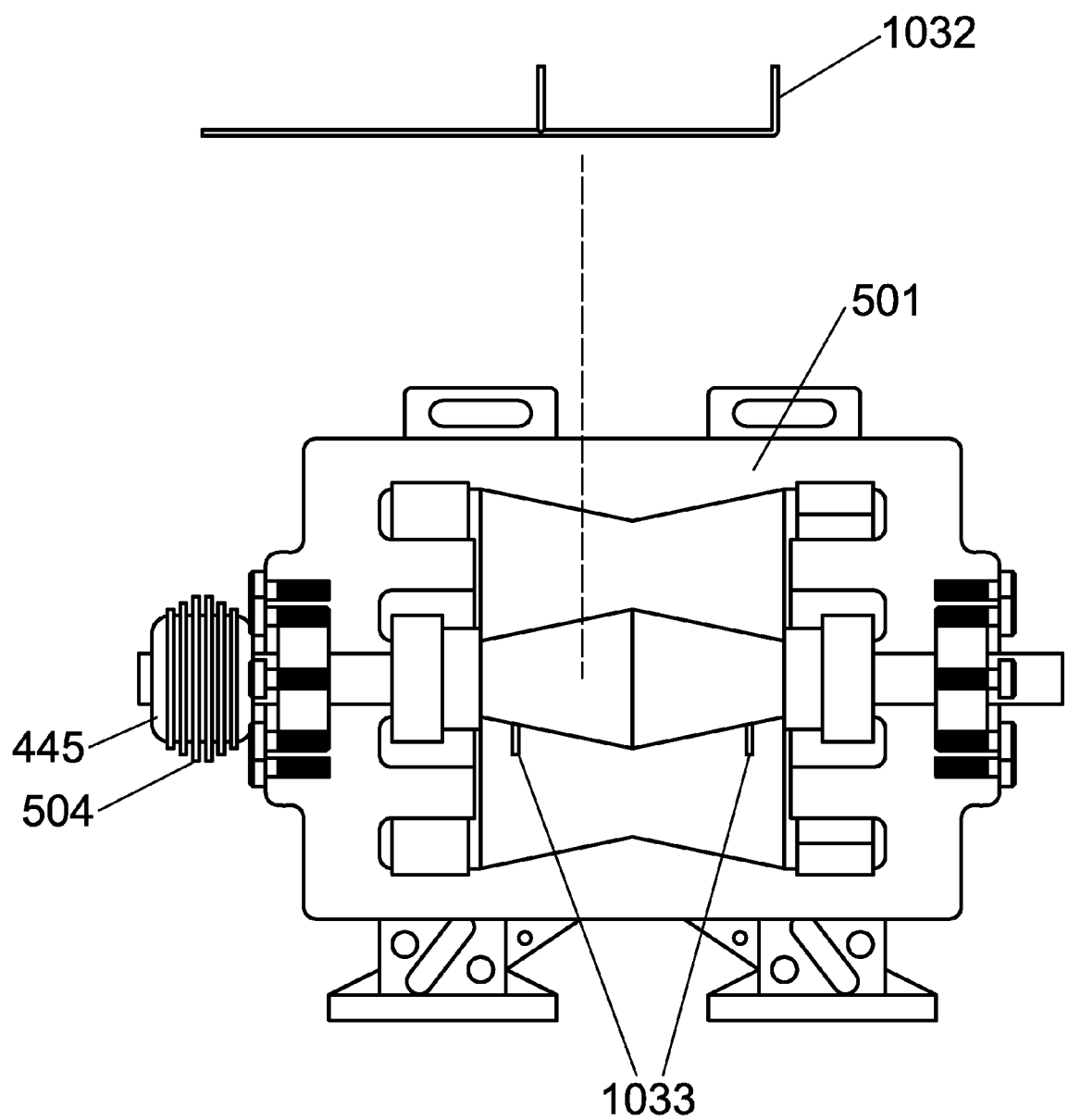
FIG. 13 is a cutaway partially exploded view of the superconducting acyclic homopolar electromechanical power converter with the outer field coils and the rotor cylinder removed to show the rotor center core and cryogenic tubing.

FIG. 13 further shows the cryogenic feed tubing 1032 exploded from the view for clarity. The cryogenic return tubing 1033 is similar in form and structure to the cryogenic feed tubing 1032. The cryogenic tubing feeds coolant from the cryocooler 445 to the interior volume of the machine frame 501 in some embodiments of the present invention. In other embodiments of the present invention, only the superconducting series connections are cooled, and coolant is fed to the cryosleeves 417 shown in FIG. 8.

Figure 14:
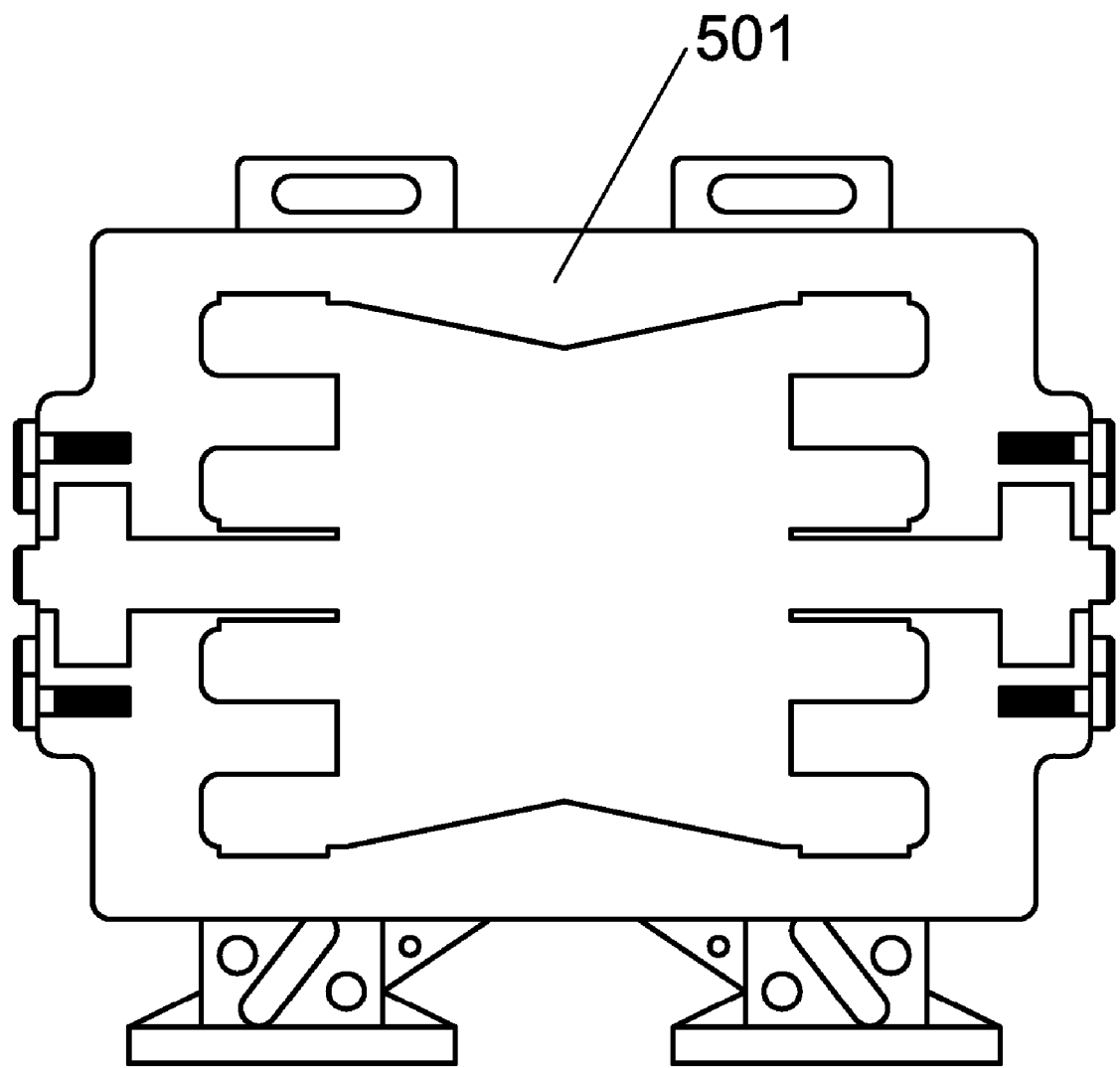
FIG. 14 is a cutaway view of the frame of the superconducting acyclic homopolar electromechanical power converter.

Lastly, FIG. 14 depicts a cutaway view of the frame 501 of the superconducting acyclic homopolar electromechanical power converter.

It is, therefore, apparent that there has been provided, in accordance with the various objects of the present invention, a superconducting acyclic homopolar electromechanical power converter. While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification and the claims appended herein.

What is claimed is:

1. An electromechanical power converter comprising:
   a frame comprising field coils and a shaft disposed between the field coils; and
   a single flux isolating rotor cylinder coupled to said shaft, the flux isolating rotor cylinder comprising a plurality of conductor elements connected in series by superconducting series connections.

2. The electromechanical power converter as recited in claim 1, wherein the electromechanical power converter is acyclic and homopolar.

3. The electromechanical power converter as recited in claim 1 further comprising a cryogenic cooler operatively coupled to said superconducting series connections for lowering the operating temperature of said superconducting series connections.

4. The electromechanical power converter as recited in claim 1 wherein the conductor elements are arranged on both the interior surface and the exterior surface of said rotor cylinder.

5. The electromechanical power converter as recited in claim 1 wherein the conductor elements are electrically insulated.

6. The electromechanical power converter as recited in claim 1 wherein the field coils comprise superconducting field coils.

7. The electromechanical power converter as recited in claim 1 further comprising a rotor center core mechanically coupled and symmetrically disposed about said shaft.

8. The electromechanical power converter as recited in claim 1 further comprising brushes and slip rings for making electrical contact with the conductor elements of the rotor cylinder.

9. The electromechanical power converter as recited in claim 1 further comprising a brushless exciter for making electrical contact with the conductor elements of the rotor cylinder.

10. An electric machine rotor comprising a flux isolating rotor cylinder having a plurality of conductor elements mounted to the cylinder, and superconducting series connectors for electrically connecting the conductor elements in series with each other.

11. The electric machine rotor of claim 10, wherein the conductor elements are copper.

12. The electric machine rotor of claim 10, wherein the conductor elements comprise superconducting elements.

* * * * *